United States Patent
Asai et al.

(10) Patent No.: US 8,727,092 B2
(45) Date of Patent: May 20, 2014

(54) SEGMENT-TYPE FRICTION MATERIAL

(75) Inventors: Kazunari Asai, Toyota (JP); Masato Suzuki, Toyota (JP)

(73) Assignee: Aisin Kako Kabushiki Kaisha, Toyota-shi, Aichi (JP)

( * ) Notice: Subject to any disclaimer, the term of this patent is extended or adjusted under 35 U.S.C. 154(b) by 864 days.

(21) Appl. No.: 11/262,917

(22) Filed: Nov. 1, 2005

(65) Prior Publication Data

US 2006/0090979 A1   May 4, 2006

(30) Foreign Application Priority Data

Nov. 2, 2004   (JP) .................................. 2004-319449

(51) Int. Cl.
*F16D 13/72* (2006.01)

(52) U.S. Cl.
USPC ................. 192/70.12; 192/70.14; 192/113.36

(58) Field of Classification Search
USPC ................................ 192/70.12, 70.14, 113.36
See application file for complete search history.

(56) References Cited

U.S. PATENT DOCUMENTS

| | | | |
|---|---|---|---|
| 4,674,616 A | 6/1987 | Mannino, Jr. | |
| 5,094,331 A | 3/1992 | Fujimoto et al. | |
| 6,035,991 A | 3/2000 | Willwerth et al. | |
| 6,062,367 A | 5/2000 | Hirayanagi et al. | |
| 6,283,265 B1 | 9/2001 | Hirayanagi et al. | |
| 6,409,006 B1 | 6/2002 | Wakamori et al. | |
| 6,499,579 B2 * | 12/2002 | Ono et al. | 192/113.36 |
| 6,702,088 B2 * | 3/2004 | Kitaori et al. | 192/113.36 |
| 2001/0023803 A1 | 9/2001 | Hattori | |
| 2006/0090979 A1 | 5/2006 | Asai et al. | |

FOREIGN PATENT DOCUMENTS

| | | |
|---|---|---|
| JP | 2001295859 A | 10/2001 |
| JP | 2002242954 A | 8/2002 |
| JP | 2002-340071 | 11/2002 |

OTHER PUBLICATIONS

"Introduction to Fluid Mechaniics, Sixth Edition", Rober W. Fox, p. 434.*
Japanese Office Action dated Aug. 12, 2008, issued in corresponding Japanese Patent Application No. 2004-319449.

* cited by examiner

*Primary Examiner* — Derek D Knight
(74) *Attorney, Agent, or Firm* — Westerman, Hattori, Daniels & Adrian, LLP

(57) ABSTRACT

A segment-type friction material is composed of segment pieces. An outer circumference of the segment piece is away from an outer circumference of a core plate. A setback amount is about 2 mm. Then, a gap between the outer circumference of the segment piece and an inner peripheral part of an automatic transmission case becomes large. Thus, there is generated a part at which a gap between the segment pieces and a separator plate becomes large in a disengaged state.

11 Claims, 3 Drawing Sheets

SEGMENT-TYPE FRICTION MATERIAL

BACKGROUND OF THE INVENTION

1. Field of the Invention

This invention relates to a wet friction material that generates a torque by applying a high pressure to an opposite surface while being immersed in an oil. In detail, this invention relates to a segment-type friction material made by joining segment pieces made of a friction material substrate on one or both of opposite surfaces of a core plate or a core plate of a flat ring shape along an entire circumference thereof. Each of the friction material substrates is cut into a segment piece shape. Particularly, this invention relates to a segment-type friction material having a big effect on decrease of drag torque.

2. Description of the Related Art

In recent year, a segment-type friction material as a wet friction material is under development in order to improve material yield with resultant cost reduction and to lessen drag torque with resultant high fuel efficiency in a vehicle. The segment-type friction material has a core plate of a flat ring shape and segment pieces. The segment pieces are made by cutting a friction material substrate along the ring shape or a circumferential direction of the core plate. A set of the segment pieces are arranged and joined with an adhesive on a front surface of the core plate side by side along an entire circumference of the core plate with a gap to be an oil groove. Another set of the segment pieces made by cutting the friction material substrate are joined with the adhesive to a rear surface of the core plate, too. Such segment-type friction material is applicable to a friction material clutch device that has a single or plural friction plates and that is used in an automatic transmission, which may be referred to as "AT"' hereafter, of automobiles or a transmission of motorcycles or the like.

As an example, a wet hydraulic clutch is used for an automatic transmission of an automobile or the like. The wet hydraulic clutch has plurality of segment-type friction materials and a plurality of separator plates laid alternately on each other. Then, both the plates are pressedly contacted with each other with a hydraulic pressure to transmit a torque. A lubricating oil or an automatic transmission fluid, which may be referred to as "ATF"' hereafter, is supplied to between both the plates for the purpose of absorbing a frictional heat generated when they are shifted from a disengaged state to an engaged state or preventing abrasion of the friction material or the like.

However, a distance between the segment-type friction material and the separator plate is set small in order to increase response of the hydraulic clutch. Moreover, a total area of an oil passage provided on the segment-type friction material is restricted in order to assure a sufficient torque transmission capacity at the time of clutching or engaging operation of the hydraulic clutch. Consequently, it is hard to discharge the lubricating oil remaining between the segment-type friction material and the separator plate at the time of unclutching or disengaging operation of the hydraulic clutch. As a result, there was a drawback that drag torque was generated due to the lubricating oil by relative rotation of both the plates.

In view of the above, according to an invention described in Japanese Laid Open Patent Publication No. 2002-340071, a wet friction plate as a segment-type friction material has two-tiered segment pieces arranged at an inner circumference and an outer circumference thereof. At least part of an inner peripheral edge of the segment piece is inclined outwardly in a radial direction toward a radial inner end of a radially extending oil passage that faces a lagging side in a rotating direction. Thus, in the publication No. 2002-340071, it is recited that it can guide the lubricating oil effectively to the radial inner end of the radially extending oil passage.

However, in the technique described in the above patent publication No. 2002-340071, the radially extending oil passage is narrow and extends with a same width. In contrast, a test was conducted to show a relation between a groove width ratio (a/b) of an outer opening "a" and an inner opening "b" of the radially extending oil passage and a drag torque reduction rate in the segment-type friction material shown in FIG. 5. Then, it was confirmed that the segment-type friction material only had a torque reduction rate of about 30% in case the groove width ratio (a/b) equaled 1.0 or the oil passage extended with the same width. That is, such segment-type friction material only had a half effect of segment-type friction materials whose groove width ratio (a/b) equaled 3.0 or 4.0. FIG. 5 is a drawing showing a relation between a groove width ratio and a drag torque reduction rate in a segment-type friction material. Moreover, in the technique described in the patent publication No. 2002-340071, the segment pieces cut into small pieces are joined with an adhesive in two tiers at the inner circumference and the outer circumference thereby needing a time and effort in manufacturing. But, none the less, there is a problem that the drag torque is not reduced enough by the lubricating oil.

BRIEF SUMMARY OF THE INVENTION

An object of the present invention is to provide a segment-type friction material that reduces a drag torque sufficiently even at a portion where a lubricating oil remains in a great quantity or is hard to be discharged and that can be manufactured in a short period of time so as to lower costs.

According to a first aspect of the invention, there is provided a segment-type friction material comprising a core plate of a flat ring plate shape and a plurality of segment pieces. The plurality of the segment pieces are made of a sheet-like friction material substrate into a predetermined shape. The segment pieces are disposed and joined on at least one surface of the core plate with an adhesive at predetermined intervals along the entire circumference of the flat ring plate shape of the core plate. Moreover, a setback amount between an outer peripheral edge of the core plate and an outer peripheral edge of the plurality of the segment pieces is set lager than a setback amount of a conventional segment-type friction material. For example, the setback amount is set to be about 0.7 mm or more or about 0.8% or more of a radius of the core plate.

Each of the plurality of the segment pieces may have the outer peripheral edge extending along an outer peripheral edge of the core plate, an inner peripheral edge extending along an inner peripheral edge of the core plate and a pair of lateral edges extending in substantially a radial direction of the core plate. Moreover, each of the segment pieces may have an inclined part of a given angle at a corner between the inner peripheral edge and one of the pair of the lateral edges, thereby being formed into substantially a pentagon shape. Then, the segment pieces may be arranged side by side along the circumference of at least one surface of the core plate so as to form a ring shape in a line.

The adjacent segment pieces may be symmetrically disposed as a pair such that the inclined parts of the adjacent segment pieces face to each other. A plurality of pairs of the symmetrically disposed segment pieces may be disposed at a regular interval on the core plate so that the segment pieces are disposed on at least one surface of the core plate.

The setback amount may be set within a range of about 0.8% to about 2.4% of the radius of the core plate.

Alternatively, the setback amount may be set within a range of about 1.2% to about 2.4% of the radius of the core plate.

Alternatively, the setback amount may be set within a range of about 1.2% to about 1.9% of the radius of the core plate.

The setback amount may be set within a range of about 0.7 mm to about 2.0 mm.

Alternatively, the setback amount may be set within a range of about 1.0 mm to about 2.0 mm.

Alternatively, the setback amount may be set within a range of about 1.0 mm to about 1.6 mm.

A plurality of oil grooves extending in a radial direction of the core plate may be formed by a clearance between adjacent ones of the segment pieces. The plurality of the oil grooves may be composed of first oil grooves and second oil grooves. In this case, the first oil groove has an inner peripheral opening portion that is symmetrically broadened at a constant angle to a center line of the first oil groove. The second oil groove has nearly a uniform width from an inner peripheral opening portion to an outer peripheral opening portion. The first grooves and the second grooves are mixedly disposed in a predetermined proportion.

The predetermined proportion of the first oil grooves and the second grooves may be one to one such that the first oil grooves and the second oil grooves are alternately disposed.

Further objects and advantages of the invention will be apparent from the following description, reference being had to the accompanying drawings, wherein preferred embodiments of the invention are clearly shown.

DETAILED DESCRIPTION OF THE INVENTION

Figure 1:
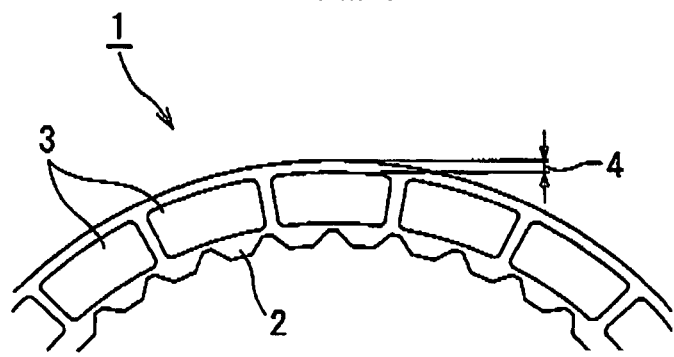
FIG. 1 is a plan view showing a part of a segment-type friction material according to a first embodiment of the invention.

Preferred embodiments of the invention are described hereafter referring to the drawings. The same reference character is used to show the same element throughout the several embodiments.

First Embodiment

Figure 2:
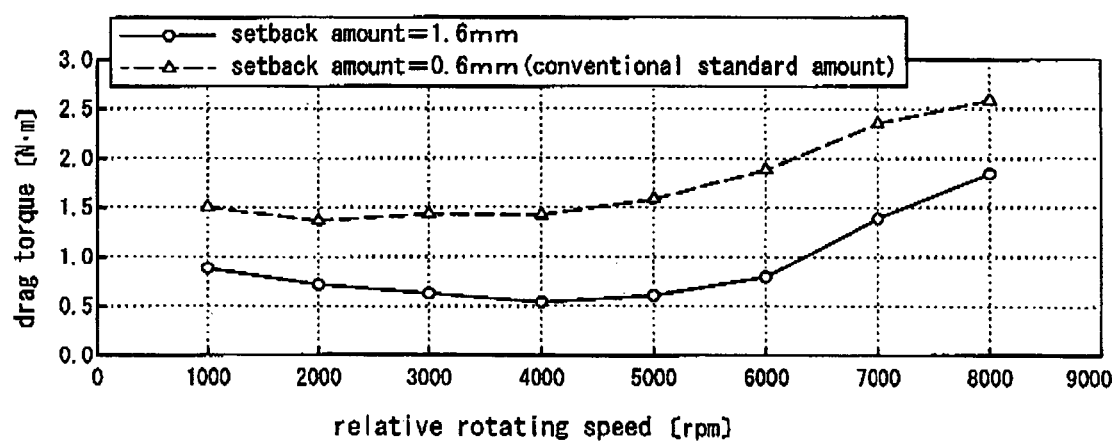
FIG. 2 is a graph showing rotating speed dependency or relativity of a drag torque in the segment-type friction material according to the first embodiment of the invention, while compared with a drag torque relativity of a conventional segment-type friction material.
Figure 3:
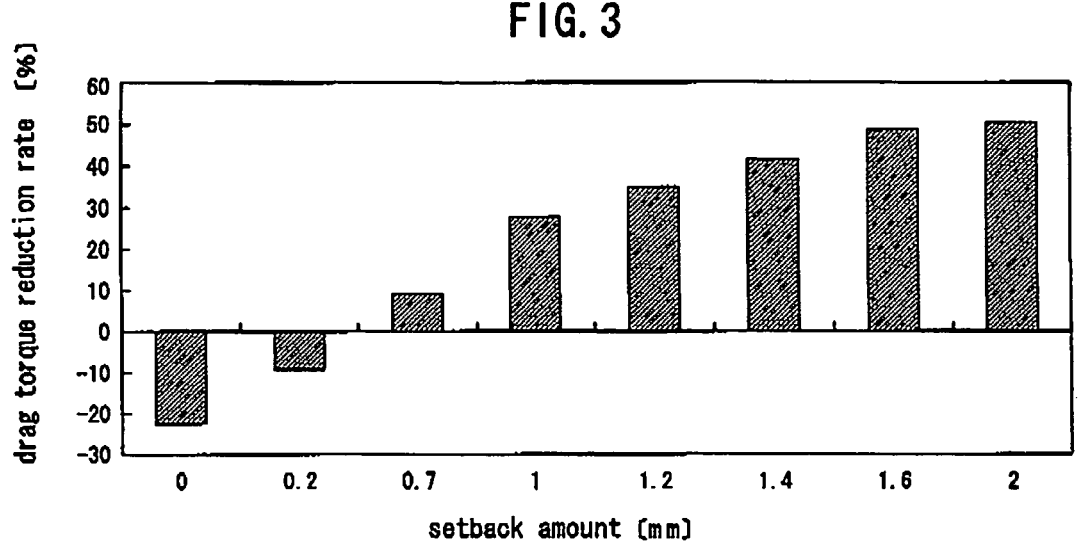
FIG. 3 is a graph showing a relationship between a setback amount and a drag torque reduction rate in the segment-type friction material according to the first embodiment of the invention.

A first embodiment of the invention is described referring to FIG. 1 to FIG. 3.

FIG. 1 is a plan view showing a part of a segment-type friction material according to a first embodiment of the invention. FIG. 2 is a graph showing rotating speed dependency or relativity of a drag torque in the segment-type friction material according to the first embodiment of the invention, while compared with a drag torque relativity of a conventional segment-type friction material. FIG. 3 is a graph showing a relationship between a setback amount and a drag torque reduction rate in the segment-type friction material according to the first embodiment of the invention.

As shown in FIG. 1, a segment-type friction material 1 of the first embodiment is made by joining a plurality of segment pieces 3 on both surfaces of a core plate 2 of a flat ring shape with an adhesive. The plurality of the segment pieces 3 are made by cutting a friction material substrate into a segment piece shape along a circumference of the flat ring plate shape of the core plate. The segment pieces 3 are joined on the opposite surfaces of the core plate 2 along an entire circumference thereof. The segment piece 3 has substantially a rectangular shape. An upper side and a lower side of the segment piece 3 are respectively curved along a curvature of an outer peripheral edge and a curvature of an inner peripheral edge of the core plate 2. A right side and a left side of the segment piece 3 are straight lines. The segment piece 3 has a shape while making all of four corners curved or rounded with a curvature. A setback amount 4 is a length or a distance from the outer peripheral edge of the core plate 2 to the upper side or an outer peripheral edge of the segment-type friction material 3. The setback amount 4 is made larger in the first embodiment of the segment-type friction material 1 than that of the conventional segment-type friction material.

Specifically, the setback amount 4 is set at 1.6 mm in the first embodiment of the segment-type friction material 1, which is larger than a standard setback amount of 0.6 mm in the conventional segment-type friction material. Since a position of the lower side of the segment piece 3 on the core plate 2 is equal to that of the conventional one, an area of the segment piece 3 of the segment-type friction material 1 decreases in proportion to increase of the setback amount 4.

If the core plate is 166.6 mm in outside diameter, the setback amount in the conventional segment-type friction material is only about 0.6 mm, that is, just about 0.7% of a radius of the core plate. Therefore, a gap or space between the segment piece and a separator plate becomes very small in a disengaged state at the outer peripheral side of the core plate, which is a part where an amount of ATF (automatic transmission fluid) is largest. Thus, the drag torque becomes large accordingly.

In the first embodiment of the segment-type friction material 1, the setback amount from the outer peripheral edge of the core plate 2 to the outer peripheral edge of the segment piece 3 is made larger than that of the conventional segment-type friction material. For example, if the setback amount is set at about 1.6 mm, there is generated a portion where the gap between the segment piece 3 and the separator plate becomes large in the disengaged state at the outer peripheral edge portion of the core plate 2. Thus, the drag torque can be decreased. In comparison with the prior art described in the above Laid Open Patent Publication No. 2002-340071, the segment piece 3 can be made large in the first embodiment. Consequently, a number of the segment pieces 3 is decreased. As a result, the first embodiment of the segment-type friction material 1 can be manufactured in a short period of time, thereby reducing costs.

As described above, the first embodiment of the segment-type friction material 1 has a sufficient drag torque reduction effect even at a portion where the lubricating oil is in much amount or at a portion where the lubricating oil is hard to be discharged. Moreover, the segment piece 3 can be made large, so that the segment-type friction material 1 can be manufactured in a short period of time, thereby reducing costs.

A test for measurement of the drag torque in the segment-type friction material 1 was carried out in comparison with a conventional segment-type friction material. As a test condition, a disc size of the first embodiment was set at ϕ165 and ϕ140. The disc size is defined by a diameter or a curvature radius of the upper side and a diameter or a curvature radius of the lower side of the segment piece 3. Accordingly, a disc size of the conventional one was set at ϕ166 and ϕ140. A number of discs was set at three. That is, a number of separate plates was set at four. A back clearance was set at 0.25 mm per plate. A relative rotating speed was set at 1000 to 8000 rpm. An oil temperature of ATF was set at 80° C. A lubricating oil amount of ATF was set at ½ dip+200 ml/min. That is, the ATF was fed in such an amount that one-half of the disc was presoaked. Then, the ATF was supplied in an oil amount of 200 ml/min and at an oil temperature of 80° C. after the discs began rotating.

A result of the test is shown in FIG. 2. In every relative rotating speed, the drag torque is smaller in the first embodiment of the segment-type friction material 1 that has the setback amount of 1.6 mm. Thus, there is shown an outstanding drag torque suppressing effect according to the first embodiment of the segment-type friction material 1.

Next, a relationship of the setback amount and the drag torque reduction rate is described referring to FIG. 3. A test was carried out under the same test condition as the measurement test of the drag torque shown in FIG. 2. The drag torque reduction rate was calculated as an average value of drag torque reduction rate values that were measured within a range of 1000 to 8000 rpm. As a shown in FIG. 3, if the setback amount is smaller than that of the conventional segment-type friction material or smaller than 0.6 mm, the drag torque rises adversely. If the setback amount is larger than that of the conventional segment-type friction material, there is shown a drag torque reduction effect. If the setback amount exceeds 1.0 mm, the drag torque reduction effect becomes significant. Moreover, it was found that, if the setback amount exceeded 2.0 mm or about 2.4% of the radius of the core plate 2, the drag torque reduction effect was hardly increased. Then, a torque transmission capacity to the separate plate was decreased in an engaged state. It was also found that, if the setback amount was increased from 1.0 mm or about 1.2% of the radius of the core plate 2 to 1.6 mm or about 1.9% of the radius of the core plate 2, the drag torque reduction effect increased essentially in direct proportion by about each 7 to 8%. It was also found that, if the setback amount exceeded 1.6 mm, an increasing rate of the drag torque reduction effect was decreased. Then, it was found that there was just a little difference in the drag torque reduction effect, that is about 2%, between the setback amount of 1.6 mm and the setback amount of 2.0 mm.

Therefore, a first range of the setback amount is preferably set within a range of 0.7 mm to 2.0 mm or within a range of about 0.8% to about 2.4% of the radius of the core plate 2. In this instance, it is possible to obtain a drag torque reduction rate of about 10% to about 50% and a significant drag torque reduction rate in comparison with the conventional one. A second range of the setback amount is preferably set within a range of 1.0 mm to 2.0 mm or within a range of about 1.2% to about 2.4% of the radius of the core plate 2. In this instance, it is possible to obtain a drag torque reduction rate of little less than about 30% to about 50% and a significant drag torque reduction rate in comparison with the conventional one. Moreover, a lower limit of the second range of the setback amount is dramatically increased even in comparison with a lower limit of the first range of the setback amount. Also, a third range of the setback amount is preferably set within a range of 1.0 mm to 1.6 mm or within a range of about 1.2% to about 1.9% of the radius of the core plate 2. In this instance, it is possible to obtain a drag torque reduction rate of little less than about 30% to little less than about 50% and a significant drag torque reduction rate in comparison with the conventional one. Moreover, it is possible to reduce an upper limit of the setback amount from 2.0 mm in the second range of the setback amount to 1.6 mm in the third range of the setback amount. That is, the third range of the setback amount can lessen the upper limit up to ⅘ of that of the second range of the setback amount, while keeping an upper limit of the drag torque reduction rate to nearly the same value. Accordingly, it is possible to enlarge a radial length or a distance from a lower side to an upper side of each of segment pieces 8, thereby increasing an area of each of the segment pieces 8. Consequently, the third range of the setback amount can obtain more preferable drag torque reduction rate that is nearly the same as that of the second range of the setback amount, while increasing a torque transmission capacity to the separate plates in an engaged state of the first embodiment of the segment-type friction material 1.

As described above, the first embodiment of the segment-type friction material 1 has a sufficient drag torque reduction effect even at a portion where the lubricating oil is in much amount or is hard to be discharged. In addition, the segment piece 3 can be made larger in comparison with the technique described in the above mentioned Laid Open Patent Publication No. 2002-340071. Accordingly, it is possible to lessen the total number of the segment pieces 3 used in one segment-type friction material 1, thereby enabling its manufacture in a short period of time with a resultant cost reduction.

Second Embodiment

Figure 4A:
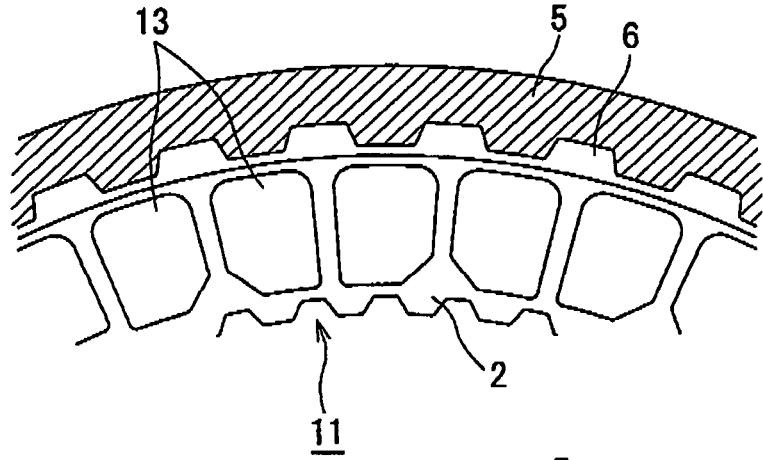
FIG. 4 are explanatory drawings showing a part of an AT case that houses the segment-type friction material according to a second embodiment of the invention, while compared with a part of an AT case that houses a comparison example of a segment-type friction material, wherein the figure (*a*) shows the comparison example and the figure (*b*) shows the second embodiment, respectively.
Figure 4B:
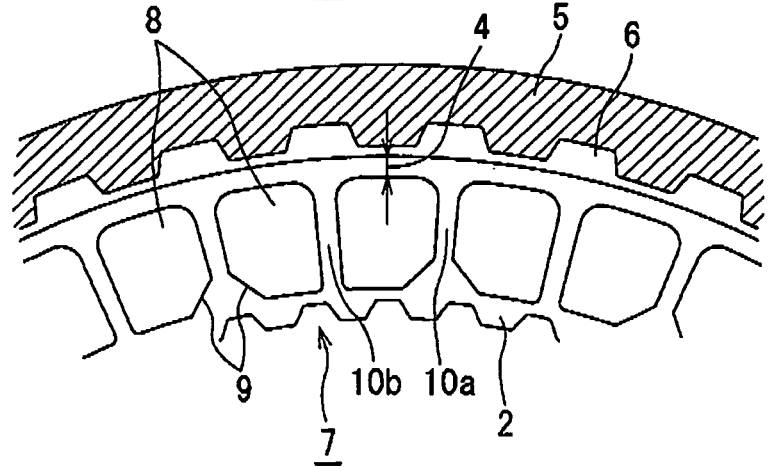
Figure 5:
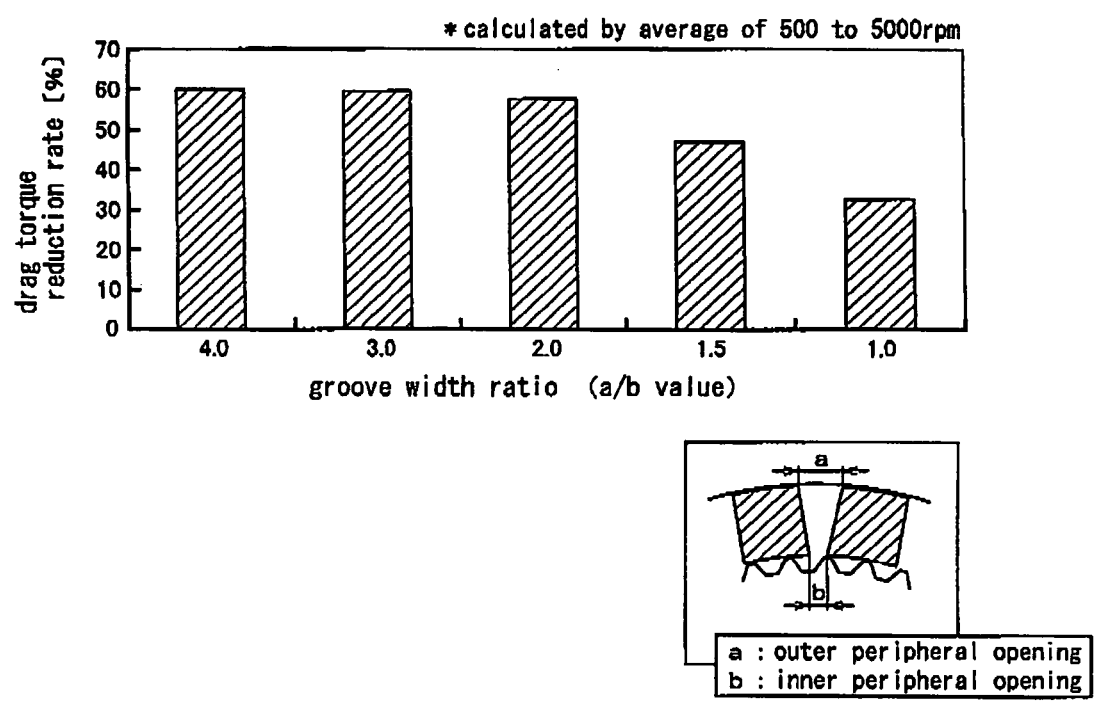
FIG. 5 are a graph and an explanatory drawing showing a relationship between a width ratio of an inner groove and an outer groove and a drag torque reduction rate in the segment-type friction material.

Next, a segment-type friction material according to a second embodiment of the invention is described referring to FIG. 4. FIG. 4 are explanatory drawings showing a part of an AT case that houses the segment-type friction material according to a second embodiment of the invention, while compared with a part of an AT case that houses a comparison example of a segment-type friction material, wherein the figure (*a*) shows the comparison example and the figure (*b*) shows the second embodiment, respectively.

As shown in figure (*a*) of FIG. 4, an outer peripheral edge of a segment piece 13 is close to an outer peripheral edge of the core plate 2 in a segment-type friction material 11 of a comparative example. An AT case 5 has a concavo-convex groove cut along an inner periphery thereof. The concavo-convex groove is a groove with which a concavo-convex outer peripheral edge of a separator plate 6 meshes. Since an interval between the concavo-convex groove of the AT case 5 and the outer peripheral edge of the segment piece 13 is narrow or small, the setback amount becomes also narrow or small accordingly. Here, the setback amount is an interval between the outer peripheral edge of the segment piece 13 and a convex part of the concavo-convex groove of the AT case 5. In contrast, as shown in figure (*b*) of FIG. 4, an outer periphery of the segment piece 8 that makes up a segment-type friction material 7 of the second embodiment is much more away from an outer peripheral edge of the core plate 2 in comparison with the comparative example. Moreover, the setback amount 4 is about 2 mm and larger than that of the comparative example. Therefore, an interval between the outer peripheral edge of the segment piece 8 and the inner peripheral concavo-convex groove of the AT case 5 that engages with the separator plate 6 is larger than that of the comparative example.

As shown in figure (b) of FIG. 4, each of the segment pieces 8 of the segment-type friction material 7 of the second embodiment has an outer peripheral edge and an inner peripheral edge respectively extending along the outer peripheral edge and the inner peripheral edge of the core plate 2 of the flat ring shape. Each of the segment pieces 8 also has a pair of lateral side edges or right side edge and a left side edge that respectively extend in generally the radial direction of the core plate 2. An inclined portion of a give angle is provided at a corner 9 between the inner peripheral edge and one of the pair of the lateral side edges or the right and left side edges. Thus, each of the segment pieces 8 is formed into nearly a pentagon shape. The plurality of the segment pieces 8 is arranged side by side along the circumference of at least one surface of the core plate 2 so as to make a ring shape in a line. Specifically, an adjacent pair of the segment pieces 8 have the opposite corners 9 at their radially inner peripheral sides linearly cut at a given angle so as to be symmetrical. For example, the corners are cut at about 45° to the radial direction of the segment-type friction material 7 or to the lateral side edge on which the corner 9 is formed in the segment piece 8. Thereby, a clearance or gap is formed between each pair of the facing corner portions 9. The clearance has substantially a trapezoidal shape that is broadened along the radius of the core plate 2 or the segment-type friction material 7 toward the inner peripheral edge thereof. Another corner opposite to the corner 9 of the adjacent pair of the segment pieces 8 is not cut but is formed into a right-angle corner portion of an angle of about 90 degrees.

Consequently, an oil groove 10a and an oil groove 10b are formed by the clearance or gap of the adjacent segment pieces 8 between all the segment pieces 8. Each of the oil grooves 10a and 10b extends in the radial direction of the segment-type friction material 7. The oil groove 10a having the corner 9 has an inner peripheral side opening portion symmetrically broadened at a uniform angle to a centerline of the oil groove 10a. The other portion of the oil groove 10a than the inner peripheral side opening portion has generally a uniform width. The oil groove 10b has a constant width from an inner peripheral opening portion to an outer peripheral opening portion in substantially the same width as the uniform width portion of the oil groove 10a. The oil groove 10a and the oil groove 10b are alternately disposed and formed in a same number. The segment-type friction material 7 of the second embodiment arranges the symmetrical segment pieces 8 of the deformed pentagon shape so as to make a pair. The segment pieces 8 making the pair are used in a required number of pairs in accordance with a circumferential length of the core plate 2. Moreover, the segment-type friction material 7 of the second embodiment arranges the pair of the segment pieces 8 having the symmetric shape in a symmetrical way at a regular interval in the circumferential direction of the core plate 2. Then, the pair of the symmetrically disposed segment pieces 8 are arranged at a constant interval along the entire circumference of the core plate 2. Thereby, the oil grooves 10a and the oil grooves 10b of different shapes are alternately disposed in the same number between the adjacent segment pieces 8. While the interval of a nearly parallel portion of the oil groove 10a or an interval between the lateral side edges of the adjacent segment pieces 8 and an interval of the oil groove 10b are set substantially the same, they may be set at different intervals in width.

Therefore, when the segment-type friction material 7 turns idle in either direction when the segment-type friction material 7 and the separator plate 6 are disengaged, the ATF supplied from the inner periphery touches or hits the corner portion 9 that is a broadened portion at a rear side in the rotating direction. Thereby, the ATF is supplied from the hit corner portion 9 to a friction surface of the segment piece 8 having the corner portion 9 and to a friction surface of the adjacent segment piece 8. Thus, the separator plate 6 is refrained from touching with the friction surface of the segment piece 8. Then, an excess ATF is discharged from the oil groove 10b of the uniform width between the inner peripheral opening portion and the outer peripheral opening portion. Accordingly, a significant drag torque reduction effect can be obtained while combined or coupled with an effect by increase of the setback amount 4.

As described above, the second embodiment of the segment-type friction material 7 has s sufficient drag torque reduction effect even at a portion where the lubricating oil is in much amount or is hard to be discharged. In addition, the segment piece 8 can be made larger in comparison with the technique described in the above mentioned Laid Open Patent Publication No. 2002-340071. Accordingly, it is possible to lessen the total number of the segment pieces 8 used in one segment-type friction material 7, thereby enabling its manufacture in a short period of time with a resultant cost reduction.

The setback amount of this invention is preferably set within a range of about 0.8% to about 2.4% of the radius of the core plate. In other words, even at minimum, the setback amount is preferably set larger than the setback amount in a conventional segment-type friction material or al least at about 0.7% of the radius of the core plate. The largest setback amount is limited by a range within which a surface area of the segment piece can assure a sufficient torque transmission capacity with the separator plate in an engaged state. As a result of repeated keen experimental works by the inventors, it was found that, if the setback amount exceeded about 2.4% of the radius of the core plate, the drag torque reduction effect was hardly increased. Then, it was found that the torque transmission capacity between the segment-type friction material and the separator plate was decreased in an engaged state. The inventors have completed the invention on the basis of this knowledge.

Thus, the invention is concretized in the segment-type friction material that has a sufficient drag torque reduction effect even at a portion where the lubricating oil is in much amount or is hard to be discharged and that assures a sufficient torque transmission capacity. In addition, the segment piece can be made larger in comparison with a conventional segment piece, so that the inventive segment-type friction material can be manufactured in a short period of time, thereby reducing costs.

As a result of repeated a keen experimental work by the inventors, it was found that, if first oil grooves such as the oil grooves 10a with broadened inner peripheral openings and second oil grooves such as the oil groove 10b with a constant width were arranged in a proportion of one to one or in the same number and one after the other, the drag torque reduction effect was shown most remarkably. The inventors have completed the invention on the basis of this knowledge. Accordingly, a significant drag torque reduction effect can be obtained while combined or coupled with an effect by increase of the setback amount.

Thus, the invention is concretized in the segment-type friction material that has a sufficient drag torque reduction effect even at a portion where the lubricating oil is in much amount or is hard to be discharged and that assures a sufficient torque transmission capacity. In addition, the segment piece can be made larger in comparison with a conventional segment piece, so that the inventive segment-type friction material can be manufactured in a short period of time, thereby reducing costs.

Each of the embodiments is described above with an example of the segment-type friction material that has the segment pieces fixed on the both surfaces of the core plate. However, the same function and effect can be obtained in case the invention is concretized in a segment-type friction material that has the segment pieces fixed on only one surface of the core plate 2.

In practicing the invention, it is not limited to each of the above embodiments with respect to a structure, a shape, a number, a material, a dimension, a connecting relation or the like of other portions of the segment-type friction material.

Each of the above embodiments described herein are illustrative and not restrictive, the scope of the invention being indicated in the appended claims and all variations which come within the meaning of the claims are intended to be embraced therein.

The invention claimed is:

1. A segment-type friction material comprising:
   a core plate of a flat ring plate shape; and
   a plurality of segment pieces of a fixed shape made of a sheet-like friction material substrate, the segment pieces being disposed at a predetermined intervals and joined on at least one surface of the core plate with an adhesive along an entire circumference of the flat ring plate shape of the core plate;
   a setback amount between an outer peripheral edge of the core plate and outer peripheral edges of the plurality of the segment pieces being set at about 0.7 mm or more or at about 0.8% or more of a radius of the core plate so as to reduce a torque generated at between the outer peripheral edges of the plurality of the segment pieces and a separator plate facing the segment pieces.

2. The segment-type friction material according to claim 1, in which each of the plurality of the segment pieces has the outer peripheral edge extending along an outer peripheral edge of the core plate, an inner peripheral edge extending along an inner peripheral edge of the core plate and a pair of lateral edges extending in substantially a radial direction of the core plate, each of the segment pieces has an inclined part of a given angle at a corner between the inner peripheral edge and only one of the pair of the lateral edges, thereby being formed into substantially a pentagon shape, and the segment pieces are arranged side by side along the circumference of at least one surface of the core plate so as to form a ring shape in a line.

3. The segment-type friction material according to claim 2, in which the adjacent segment pieces are symmetrically disposed as a pair such that the inclined parts of the adjacent segment pieces face to each other, a plurality of pairs of the symmetrically disposed segment pieces is disposed at a regular interval on the core plate so that the segment pieces are disposed on at least one surface of the core plate.

4. The segment-type friction material according to claim 1, in which the setback amount is set within a range of about 0.8% to about 2.4% of the radius of the core plate.

5. The segment-type friction material according to claim 1, in which the setback amount is set within a range of about 1.2% to about 2.4% of the radius of the core plate.

6. The segment-type friction material according to claim 1, in which the setback amount is set within a range of about 1.2% to about 1.9% of the radius of the core plate.

7. The segment-type friction material according to claim 1, in which the setback amount is set within a range of about 0.7 mm to about 2.0 mm.

8. The segment-type friction material according to claim 1, in which the setback amount is set within a range of about 1.0 mm to about 2.0 mm.

9. The segment-type friction material according to claim 1, in which the setback amount is set within a range of about 1.0 mm to about 1.6 mm.

10. The segment-type friction material according to claim 1, further comprising a plurality of oil grooves extending in a radial direction of the core plate formed by a clearance between adjacent ones of the segment pieces, the plurality of the oil grooves being composed of first oil grooves and second oil grooves, the first oil groove having an inner peripheral opening portion that is symmetrically broadened at a constant angle to a center line of the first oil groove, the second oil groove having nearly a uniform width from an inner peripheral opening portion to an outer peripheral opening portion, and the first grooves and the second grooves being mixedly disposed in a predetermined proportion.

11. The segment-type friction material according to claim 10, in which the predetermined proportion of the first oil grooves and the second grooves may be one to one such that the first oil grooves and the second oil grooves are alternately disposed.

* * * * *